United States Patent
Destarac et al.

(10) Patent No.: US 6,858,696 B2
(45) Date of Patent: Feb. 22, 2005

(54) METHOD FOR SYNTHESIS OF HYBRID SILICON AND ORGANIC COPOLYMERS BY CONTROLLED FREE RADICAL POLYMERIZATION

(75) Inventors: Mathias Destarac, Paris (FR); Gérard Mignani, Lyons (FR); Samir Zard, Gif-sur-Yvette (FR); Béatrice Sire, Palaiseau (FR); Chakib Kalai, Paris (FR)

(73) Assignee: Rhodia Chimie, Boulogne Billancourt ( * ) Notice: Subject to any disclaimer, the term of this patent is extended or adjusted under 35 U.S.C. 154(b) by 2 days.

(21) Appl. No.: 10/333,882

(22) PCT Filed: Jul. 25, 2001

(86) PCT No.: PCT/FR01/02433

§ 371 (c)(1),
(2), (4) Date: Jul. 31, 2003

(87) PCT Pub. No.: WO02/08307

PCT Pub. Date: Jan. 31, 2002

(65) Prior Publication Data

US 2004/0030058 A1 Feb. 12, 2004

(51) Int. Cl.$^7$ .................. C08F 283/12; C08G 77/06
(52) U.S. Cl. ................... 528/24; 528/25; 528/38; 526/291; 526/297; 526/303.1; 526/318; 526/319; 526/335; 526/346
(58) Field of Search ............... 526/291, 297, 526/303.1, 318, 319, 346, 335; 528/24, 25, 38

(56) References Cited

U.S. PATENT DOCUMENTS 5,057,619 A * 10/1991 Kumar et al. ............... 556/420
5,071,936 A * 12/1991 Himori ....................... 528/26

FOREIGN PATENT DOCUMENTS

| EP | 0 392 947 | 10/1990 | ........... C08G/77/54 |
| EP | 0421 588 | 10/1991 | ......... C08F/283/12 |
| WO | WO 98/58974 | 12/1998 | ......... C08F/293/00 |
| WO | WO 200052061 A1 * | 9/2000 | ............. C07F/7/08 |

OTHER PUBLICATIONS

"A DFT Study of R–X Bond Dissociation Enthalpies OF Relevance to the Initiation Process of Atom Transfer Radical Polymerization", Gillies et al., Macromolecules (2003),36, 8551–8559.*

Singer H et al: "Alpha, Omega–Funktionalisierte Oligomer Eine Neuere Anwendung Der Emulsionspolymerisation" Faserforschung Und Textiltechnik, DE, Berlin, vol. 28, NR. 9, pp. 435–438 XP002049825 ISS: 0014–8628 the whole document.

International Search Report.

* cited by examiner

*Primary Examiner*—Margaret G. Moore
*Assistant Examiner*—Marc S. Zimmer

(57) ABSTRACT

The invention concerns a method for preparing by thermal activation of hybrid silicone and organic polymers comprising the motifs $R_xU_ySiO[4-(x+y)]/2$ (I) wherein: x is equal to 0, 1, 2 or 3, y is equal to 0, 1, 2 or 3 with $2 \leq (x+y) \leq 3$ and y is different from 0 for at least one of the hybrid copolymer motifs; and the symbols U, identical or different, represent organic polymer units.

16 Claims, No Drawings

METHOD FOR SYNTHESIS OF HYBRID SILICON AND ORGANIC COPOLYMERS BY CONTROLLED FREE RADICAL POLYMERIZATION

This application is an application under 35 U.S.C. Section 371 of International Application No. PCT/FR01/02433 filed on Jul. 25, 2001.

The present invention relates to a novel thermal controlled free-radical polymerization process that gives access to copolymers of silicone and organic nature and also to the products obtained by this process. These copolymeric products obtained consist of a silicone skeleton onto which are grafted organic groups in block or multiblock form.

Block polymers are usually prepared by ionic polymerization. This type of polymerization has the drawback of allowing the polymerization of only certain types of apolar monomers, especially styrene and butadiene, and of requiring a particularly pure reaction medium and temperatures that are often below room temperature so as to minimize the parasitic reactions, resulting in severe implementation constraints.

Free-radical polymerization has the advantage of being easy to implement without having to comply with excessive purity conditions, and at temperatures greater than or equal to room temperature. However, until recently, no free-radical polymerization process for obtaining block polymers existed. A novel free-radical polymerization process has just recently been developed: this is the "controlled" or "living" free-radical polymerization (Matyjaszewski, K., Ed. *Controlled Radical Polymerization*; ACS Symposium Series 685; American Chemical Society: Washington, D.C., 1998). In these systems, reversible transfer or termination reactions make it possible to keep the ends active throughout the polymerization, consequently giving access to various block copolymers.

Block polymers are obtained when the ends of polymer chains are activated in radical form by reversible homolytic cleavage of a bond (for example C—O or C-halogen).

Publication WO 98/58974 describes a living free-radical polymerization process for gaining access to block copolymers via a process without UV irradiation, by using xanthate compounds. Publications WO 99/35177 and WO 99/35178 describe living free-radical polymerization processes controlled with dithiocarbamate compounds or dithioester compounds.

The techniques of living free-radical polymerization mainly concern organic (co)polymers. However, the synthesis of organic-mineral block copolymers has also been described; in this respect, reference may be made to publication EP 421 588.

However, the techniques described have certain drawbacks. For example, the nature of the organic blocks is limited. Furthermore, it has not been possible hitherto to benefit from a method of preparation that is at the same time easy to implement, that allows a very large number of organic monomers to be polymerized, and that gives access to blocks of well-controlled length and narrow molecular distribution.

A novel process for preparing silicone and organic hybrid polymers has now been developed. This novel route has the advantage of not requiring the use of a source of UV irradiation, which is difficult to implement industrially.

Moreover, this novel process allows the synthesis of silicone and organic hybrid copolymers whose polymerized organic monomers are of very varied nature.

Another aim is to propose a controlled free-radical polymerization process for the synthesis of silicone and organic copolymers comprising no metallic impurities that are harmful to their use.

Another aim is to obtain organic blocks of controlled lengths. Another aim is to obtain organic blocks of narrow molecular distribution.

Another aim is to develop a process that may be implemented in solution, in bulk, in dispersion, in suspension or in emulsion, preferably in solution and in emulsion.

These aims are achieved by the present invention, which relates to a process of free-radical polymerization under thermal activation for the preparation of silicone and organic hybrid copolymers consisting of a silicone skeleton and bearing organic groups, and prepared from a silicone precursor, at least one organic ethylenically unsaturated monomer and a free-radical polymerization initiator.

The invention also relates to the hybrid copolymers that may be obtained by the above process.

Finally, the invention relates to the precursor silicones, and also to processes for obtaining them, used for the preparation of the hybrid copolymers.

Other details and advantages of the invention will emerge more clearly on reading the description and the examples.

The invention thus relates firstly to a process for the preparation, by thermal activation, of silicone and organic hybrid copolymers comprising units (I):

$$R_xU_ySiO_{[4-(x+y)]/2} \tag{I}$$

in which:

x is equal to 0, 1, 2 or 3, y is equal to 0, 1, 2 or 3 with $2<(x+y)\leq 3$ and y is other than 0 for at least one of the units of the hybrid copolymer, the symbols R, which may be identical or different, represent:

a linear or branched alkyl radical containing 1 to 8 carbon atoms, optionally substituted with at least one halogen, preferably fluorine, the alkyl radicals preferably being methyl, ethyl, propyl, octyl and 3,3,3-trifluoropropyl, a cycloalkyl radical containing between 5 and 8 ring carbon atoms, which is optionally substituted, an aryl radical containing between 6 and 12 carbon atoms, which may be substituted, preferably phenyl or dichlorophenyl, an aralkyl portion having an alkyl portion containing between 5 and 14 carbon atoms and an aryl portion containing between 6 and 12 carbon atoms, optionally substituted on the aryl portion with halogens, alkyls and/or alkoxyls containing 1 to 3 carbon atoms, the symbols U, which may be identical or different, represent (II):

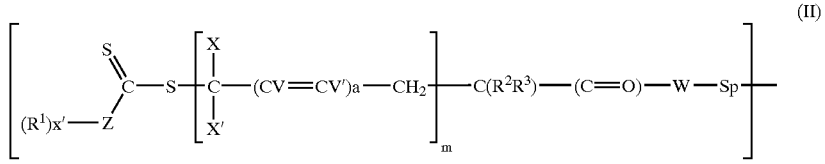

in which:
x'=1, 2, 3 or 4 depending on the valency of Z,
Z, which may be identical or different, represent a carbon, sulfur, oxygen, phosphorus or nitrogen atom and/or a free valency,
$R^1$, which may be identical or different, represent:
an optionally substituted alkyl, acyl, aryl, alkene or alkyne group (i),
a saturated or unsaturated, optionally substituted and/or aromatic carbon-based ring (ii), and/or
a saturated or unsaturated, optionally substituted heterocycle (iii),
these radicals (i), (ii) and (iii) possibly being advantageously substituted with: substituted phenyl groups, substituted aromatic groups, or groups: alkoxycarbonyl, aryloxycarbonyl (—COOR$^5$), carboxyl (—COOH), acyloxy (—O$_2$CR$^5$), carbamoyl (—CONR$^5_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$^5_2$), halogen, allyl, epoxy, alkoxy (—OR$^5$), S-alkyl, S-aryl, groups of hydrophilic or ionic nature such as alkaline salts of carboxylic acids, alkaline salts of sulfonic acid, polyalkylene oxide (PEO, PPO) chains, cationic substituents (quaternary ammonium salts), $R^5$, which may be identical or different, representing an alkyl or aryl group, and/or a polymer chain,
a group (iv) of formula —C$_n$F$_{(2n+1)}$ with n being between 1 and 20,
a group (v) of the following formula:

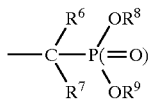

in which:
$R^6$, $R^7$, which may be identical or different, are chosen from a halogen group, —NO$_2$, —SO$_3$R$^{10}$, —NCO, —CN, —OR$^{10}$, —SR$^{10}$, —N(R$^{10}$)$_2$, —COOR$^{10}$, —O$_2$CR$^{10}$, —CON(R$^{10}$)$_2$, —NCO(R$^{10}$)$_2$ and —C$_n$F$_{(2n+1)}$ with n being between 1 and 20 and preferably equal to 1;
with $R^{10}$ representing:
a hydrogen atom,
or an alkyl, alkenyl, alkynyl, cycloalkenyl, cycloalkynyl, alkaryl, aralkyl, heteroaryl or aryl radical optionally fused to an aromatic or nonaromatic heterocycle; these radicals possibly being substituted with:
one or more groups, which may be identical or different, chosen from halogen atoms, =O, =S, —OH, alkoxy, SH, thioalkoxy, NH$_2$, monoalkylamino, dialkylamino, CN, COOH, ester, amide or C$_n$F$_{(2n+1)}$ and/or optionally interrupted with one or more atoms chosen from O, S, N and P;
or a heterocyclic group optionally substituted with one or more groups as defined above;
or $R^6$ and $R^7$ together form, with the carbon atom to which they are attached, a group =O, =S, a hydrocarbon-based ring or a heterocycle; and
$R^8$ and $R^9$, which may be identical or different, represent a group as defined above for $R^{10}$; or together form a $C_2$–$C_4$ hydrocarbon-based chain optionally interrupted with a hetero atom chosen from O, S and N;
V and V', which may be identical or different, represent: H, an alkyl group or a halogen,
X and X', which may be identical or different, represent H, a halogen or a group $R^4$, OR$^4$, O$_2$COR$^4$, NHCOH, OH, NH$_2$, NHR$^4$, N(R$^4$)$_2$, (R$^4$)$_2$N$^+$O$^-$, NHCOR$^4$, CO$_2$H, CO$_2$R$^4$, CN, CONH$_2$, CONHR$^4$ or CONR$^4_2$, in which $R^4$ is chosen from alkyl, aryl, aralkyl, alkaryl, alkene and organosilyl groups, optionally perfluorinated and optionally substituted with one or more carboxyl, epoxy, hydroxyl, alkoxy, amino, halogen or sulfonic groups,
$R^2$ and $R^3$, which may be identical or different, represent:
an optionally substituted alkyl, acyl, aryl, alkene or alkyne group (i),
a saturated or unsaturated, optionally substituted and/or aromatic carbon-based ring (ii),
a saturated or unsaturated, optionally substituted heterocycle (iii),
a hydrogen atom or groups: alkoxycarbonyl, aryloxycarbonyl (—COOR$^5$), carboxyl (—COOH), acyloxy (—O$_2$CR$^5$), carbamoyl (—CONR$^5_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$^5_2$), halogen, allyl, epoxy, alkoxy (—OR$^5$), S-alkyl, S-aryl, groups of hydrophilic or ionic nature such as alkaline salts of carboxylic acids, alkaline salts of sulfonic acid, polyalkylene oxide (PEO, PPO) chains, cationic substituents (quaternary ammonium salts), $R^5$, which may be identical or different, representing an alkyl or aryl group, and/or a polymer chain,
the radicals (i), (ii) and (iii) possibly being advantageously substituted with: substituted phenyl groups, substituted aromatic groups, or groups: alkoxycarbonyl, aryloxycarbonyl (—COOR$^5$), carboxyl (—COOH), acyloxy (—O$_2$CR$^5$), carbamoyl (—CONR$^5_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$^5_2$), halogen, allyl, epoxy, alkoxy (—OR$^5$), S-alkyl, S-aryl, groups of hydrophilic or ionic nature such as alkaline salts of carboxylic acids, alkaline salts of sulfonic acid, polyalkylene oxide (PEO, PPO) chains, cationic substituents (quaternary ammonium salts), $R^5$, which may be identical or different, representing an alkyl or aryl group, and/or a polymer chain, W, which may be identical or different, represent a divalent radical chosen from —O—, —$NR^4$—, —NH— and —S—, Sp, which may be identical or different, represent a coupling unit consisting of a divalent organic radical of formula —$(CH_2)_{x'''}$—, in which x''' is between 1 and 20, this radical possibly being substituted with and/or containing at least one hetero atom, a=0 or 1, m>1, and, when m>1, the repeating unit moieties of index m are identical or different, and to a process in which the following are placed in contact:

at least one ethylenically unsaturated monomer of formula (III):

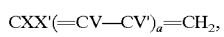

a precursor silicone compound comprising units, which may be identical or different, of formula (IV):

in which:

R, x and y correspond to the values given above, and the monovalent radical U' is according to formula (V) below:

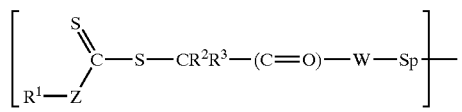

an a free-radical polymerization initiator.

The free-radical polymerization initiator may be chosen from the initiators conventionally used in free-radical polymerization. It may be, for example, one of the following initiators:

hydrogen peroxides such as: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate, ammonium persulfate, azo compounds such as: 2,2'-azobis(isobutyronitrile), 2,2'-azobis(2-butanenitrile), 4,4'-azobis(4-pentanoic acid), 1,1'-azobis-(cyclohexanecarbonitrile), 2-(t-butylazo)-2-cyanopropane, 2,2'-azobis[2-methyl-N-(1,1)-bis(hydroxymethyl)-2-hydroxyethylpropionamide, 2,2'-azobis(2-methyl-N-hydroxyethyl]propionamide, 2,2'-azobis(N,N'-dimethyleneisobutyramidine) dichloride, 2,2'-azobis(2-amidinopropane) dichloride, 2,2'-azobis(N,N'-dimethylene-isobutyramide), 2,2'-azobis(2-methyl-N-[1,1-bis-(hydroxymethyl)-2-hydroxyethyl]propionamide), 2,2'-azobis(2-methyl-N-[1,1-bis(hydroxymethyl)-ethyl]propionamide, 2,2'-azobis[2-methyl-N-(2-hydroxyethyl)propionamide], 2,2'-azobis-(isobutyramide) dihydrate, redox systems comprising combinations such as:

mixtures of hydrogen peroxide, alkyl peroxide, peresters, percarbonates and the like and any iron salts, titanium salts, zinc formaldehydesulfoxylate or sodium formaldehydesulfoxylate, and reducing sugars, ammonium or alkali metal persulfates, perborate or perchlorate in combination with an alkali metal bisulfite, such as sodium metabisulfite, and reducing sugars, alkali metal persulfates in combination with an arylphosphinic acid, such as benzenephosphonic acid and the like, and reducing sugars.

The amount of initiator to be used is determined such that the amount of radicals generated is not more than 20 mol % relative to the amount of silicone precursor compound (IV) and preferably not more than 5 mol %.

Ethylenically unsaturated monomers that are used more specifically according to the invention include monomers chosen from styrene or derivatives thereof, butadiene, chloroprene, (meth)acrylic esters, vinyl esters, vinyl nitrites, vinyl esters and unsaturated carboxylic acid amides.

Butadiene and chloroprene correspond to the case where a=1 in formulae (I) and (III).

The term "(meth)acrylic esters" denotes esters of acrylic acid and of methacrylic acid with hydrogenated or fluorinated $C_1$–$C_{12}$ and preferably $C_1$–$C_8$ alcohols. Among the compounds of this type that may be mentioned are: methyl acrylate, ethyl acrylate, propyl acrylate, n-butyl acrylate, isobutyl acrylate, 2-ethylhexyl acrylate, t-butyl acrylate, methyl methacrylate, ethyl methacrylate, n-butyl methacrylate and isobutyl methacrylate.

The vinyl nitriles more particularly include those containing from 3 to 12 carbon atoms such as, in particular, acrylonitrile and methacrylonitrile.

The vinyl esters of carboxylic acid more particularly include vinyl acetate, vinyl versatate and vinyl propionate.

The unsaturated carboxylic acid amides more particularly include acrylamide, methacrylamide, N-methylolacrylamide, N-methylolmethacrylamide and N-alkylacrylamides.

It should be noted that the styrene may be totally or partially replaced with derivatives such as α-methylstyrene or vinyltoluene.

The other ethylenically unsaturated monomers that may be used, alone or as mixtures, or that are copolymerizable with the above monomers are especially:

vinyl halides, unsaturated ethylenic monocarboxylic and dicarboxylic acids, for instance acrylic acid, methacrylic acid, itaconic acid, maleic acid, fumaric acid and the monoalkyl esters of dicarboxylic acids of the type mentioned with alkanols preferably containing from 1 to 4 carbon atoms, and the N-substituted derivatives thereof, ethylenic monomers comprising a sulfonic acid group and the ammonium or alkaline salts thereof, for example vinylsulfonic acid, vinylbenzenesulfonic acid, α-acrylamidomethylpropanesulfonic acid or 2-sulfoethylene methacrylate, vinylamine amides, especially vinylformamide or vinylacetamide, unsaturated ethylenic monomers comprising a secondary, tertiary or quaternary amino group, or a heterocyclic group containing nitrogen, such as, for example, vinylpyridines, vinylimidazole, aminoalkyl (meth)acrylates and aminoalkyl (meth)acrylamides, for instance dimethylaminoethyl (meth)acrylate, di-tert-butylaminoethyl acrylate or methacrylate, dimethylaminomethylacrylamide or dimethylaminomethyl-methacrylamide. It is likewise possible to use zwitterionic monomers such as, for example, sulfopropyl(dimethyl)aminopropyl acrylate.

For the preparation of the hybrid copolymers of formula (I) for which X=H and X'=NH₂, the ethylenically unsaturated monomers preferably used are vinylamine amides, for example vinylformamide or vinyl-acetamide. The copolymer obtained is then hydrolyzed at acidic or basic pH.

For the preparation of the hybrid copolymers of formula (I) for which X=H and X'=OH, the ethylenically unsaturated monomers that are preferably used are vinyl esters of carboxylic acid, such as, for example, vinyl acetate. The copolymer obtained is then hydrolyzed at acidic or basic pH.

The types of amounts of copolymerizable monomers used according to the present invention vary depending on the particular final application for which the hybrid copolymer is intended.

According to a first preferred variant of the invention, the silicone and organic hybrid copolymer consists of a linear silicone skeleton comprising from 1 to 300 units and preferably 1 to 200 units of formula (I), bearing from 1 to 50 and preferably 1 to 10 radicals U.

According to a second variant of the present invention, at least one of the monovalent radicals U' is preferably of formula (VI):

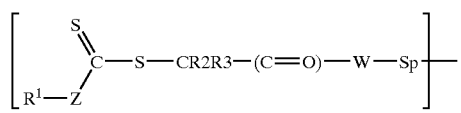

in which $R^2$ and $R^3$, which may be identical or different, represent a hydrogen atom or a cyano, alkoxycarbonyl, alkyl, acyl, aryl, alkene or alkyne group, which is optionally substituted; and W has an identical definition to that given above, and is preferably equal to an oxygen atom. Examples that will be mentioned include the silicone precursors in which U' corresponds to:

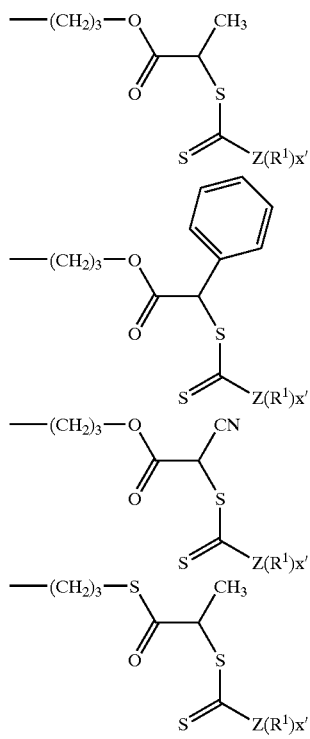

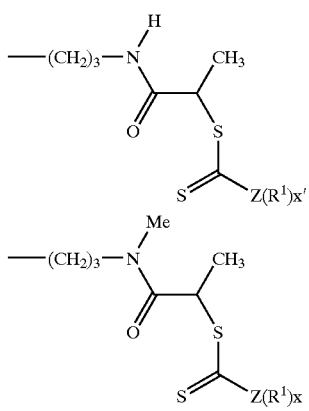

According to a third variant of the invention, at least some of the monovalent radicals U' of the silicone precursor(s) (IV) and thus at least some of the groups U of the hybrid copolymer obtained are such that Z is an oxygen atom and/or a sulfur atom.

According to a fourth variant according to the invention, in addition to the units of formula (I), the silicone and organic hybrid copolymer according to the invention may comprise units $R_xU_yF_zSiO_{[4-(x+y+z)]/2}$ (XIV) in which:

x is equal to 0, 1, 2 or 3, y is equal to 0, 1, 2 or 3 and z is equal to 1, 2 or 3 with $2 \leq (x+y+z) \leq 3$, and F is a group bearing at least one function such as hydroxyl, alkoxy, thiol, amine, epoxy and/or polyether.

These groups F may optionally provide complementary and/or additional properties to the hybrid copolymers prepared according to the process of the invention. They may especially be initially contained in the silicone precursor of formula (IV).

In addition to the hybrid copolymers with homopolymer organic segments, the process according to the invention makes it possible to prepare hybrid polymers bearing organic groups in blocks (i.e. multiblock). To do this, the process consists in repeating the implementation of the preparation process described above, using:

monomers that are different than in the previous implementation, and in place of the precursor silicone compound (II), the hybrid copolymer comprising the block units (I), obtained from the above implementation.

According to this process for preparing multiblock copolymers, when it is desired to obtain copolymers containing homogeneous blocks without a composition gradient, and if all the successive polymerizations are performed in the same reactor, it is essential that all the monomers used in one step should have been consumed before the polymerization for the next step begins, and thus before the new monomers are introduced.

As for the process for polymerizing a monoblock copolymer, this process for polymerizing block copolymers has the advantage of producing block copolymers with a low polydispersity index. It also allows the molecular mass of the block polymers to be controlled.

The precursor silicone compound of general formula (IV) used in the process for preparing the hybrid copolymers according to the invention may be obtained by reacting:

(i) a silicone comprising units of formula (VII):

in which the monovalent radical U" is according to formula (VIII) below:

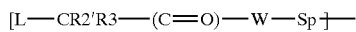

in which:
W and Sp are definitions identical to those given above,
L is a nucleophilic group, for example: Br$^-$, Cl$^-$, I$^-$, OTs$^-$, OMs$^-$, $(C_6H_6)$—(C=O)—O$^{31}$, $(CH_3)$—(C=O)—O$^-$, $(CF_3)$—(C=O)—O$^{31}$,
(ii) with a compound chosen from those of general formula (IX), (X) or (XI) below:

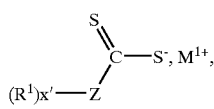 (IX)

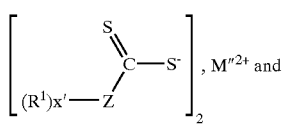 (X)

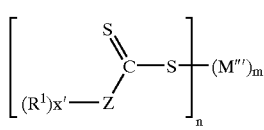 (XI)

in which:
$M^{1+}$ represents K$^+$, Na$^+$, NR$_4^+$ or PR$_4^+$, R having a definition similar to that given for R in formula (I),
$M''^{2+}$ represents an alkaline-earth metal such as Ca$^{2+}$, Ba$^{2+}$ or Sr$^{2++}$,
M''' represents Zn, Cd, m is equal to 1 or 2, n is equal to 1, 2, 3 or 4 and preferably m is equal to 1 and n is equal to 2.
This silicone of formula (VII) may especially be obtained from (i) a silicone comprising units of formula (XII):

$R_xU'''_ySiO_{[4-(x+y)]/2}$ in which the monovalent radical U''' is of formula (XIII): —Sp—WH and (ii) of a compound of formula:

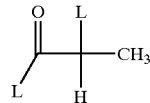

Hybrid copolymers prepared according to the process of the invention have the advantage of giving a low polydispersity index. This process also makes it possible to control the molecular mass of these polymers. The invention thus also relates to these hybrid polymers.

The hybrid copolymers that are preferred are those containing at least one block chosen from polystyrene, polymethyl acrylate, polyethyl acrylate, poly-tert-butyl acrylate, polyvinyl acetate, polybutyl acrylate, polyacrylamide, poly(2-dimethylaminoethyl acrylate) and/or poly(2-hydroxyethyl acrylate).

These polymers generally have a polydispersity index of not more than 2 and preferably of not more than 1.5.

The polymerization may be performed in bulk, in solution or in emulsion. It is preferably performed in emulsion.

The process is preferably performed semi-continuously.

The temperature may range between room temperature and 150° C. depending on the nature of the monomers used.

In general, during the polymerization, the instantaneous copolymer content relative to the instantaneous amount of monomer and copolymer is between 50% and 99% by weight, preferably between 75% and 99% and even more preferably between 90% and 99%. This content is maintained, in a known manner, by controlling the temperature and the rate of addition of the reagents and of the polymerization initiator.

The process is generally performed in the absence of a UV source.

EXAMPLES

The following examples illustrate the invention without, however, limiting its scope.

Example 1

A. Reaction scheme.

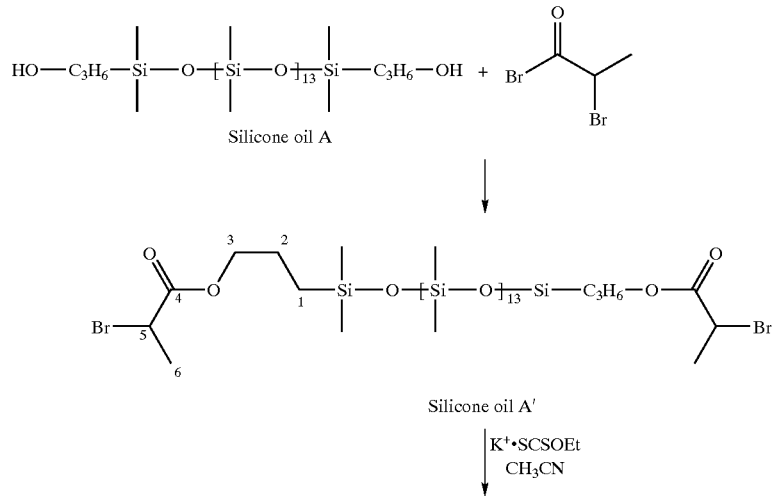

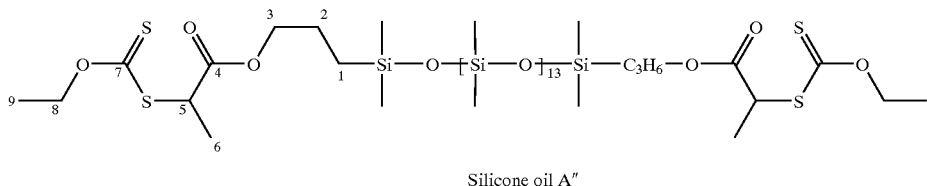

Silicone oil A″

B. Preparation of the Product A'.

1.9 ml (2.4 equivalents) of 2-bromopropionyl [lacuna] are added dropwise and at room temperature to a solution of 10 g of silicone oil A (1 equivalent) and 2.6 g (4 equivalents) of pyridine in ether (200 ml).

After stirring overnight at room temperature, 50 ml of water are added to the reaction mixture. The aqueous phase is then extracted with 2×100 ml of ethyl acetate.

The combined organic phases are then washed successively with aqueous NaOH solution (1M), aqueous 10% HCl solution, water and brine, and then dried over magnesium sulfate. The solvents are then evaporated. The crude product obtained is then chromatographed on a column of silica (9/1 heptane/ether) to give 11 g of silicone oil A'.

C. Preparation of the Silicone Precursor A″.

5 g (1 equivalent) of product A' are added at room temperature to a solution of 2.22 g (4 equivalents) of xanthate salt (K$^+$, $^-$SCSOEt) in acetonitrile (150 ml). The medium is stirred for 4 hours at room temperature.

The solvent is then evaporated off under reduced pressure, and the solid obtained is then mixed with ether and filtered through a sinter funnel. The solvent is then evaporated off to give 5.2 g of precursor A″.

Example 2

A. Reaction scheme.

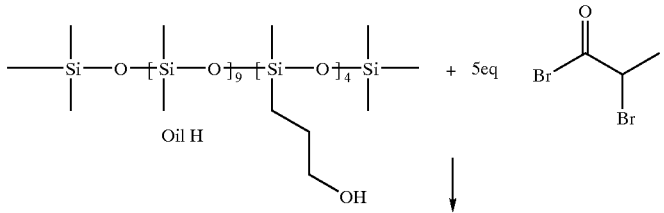

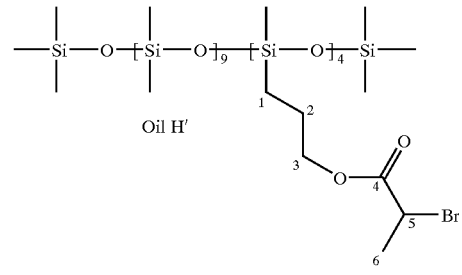

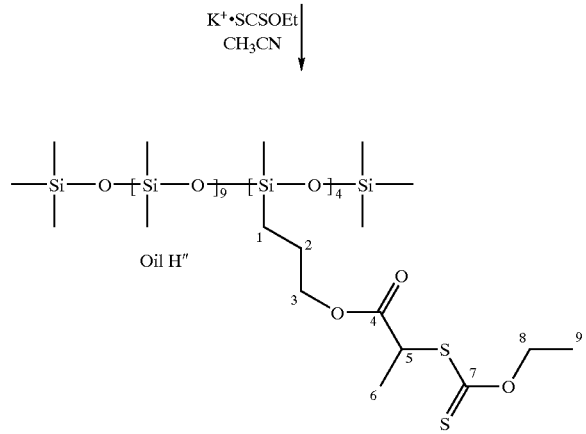

B. Preparation of the Silicone Oil B'.

4.16 ml (5 equivalents) of 2-bromopropionyl bromide are added dropwise and at room temperature to a solution of 10 g of oil B (1 equivalent) and 6.2 g (10 equivalents) of pyridine in ether (300 ml).

After stirring for 2 hours at room temperature, 200 ml of $CH_2Cl_2$ are added.

The precipitate obtained after this addition is filtered through a sinter funnel and the organic phase is washed successively with aqueous 10% HCl solution, water and brine, and then dried over magnesium sulfate. The solvents are then evaporated off to give 13.5 g of product B' on which free OHs are still present (28% of OH according to the $^1H$ NMR spectrum).

C. Preparation of the Silicone Precursor B".

6.5 g (1 equivalent) of product B' are added at room temperature to a solution of 4.6 g (8 equivalents) of xanthate salt ($K^+$, $^-SCSOEt$) in acetonitrile (300 ml). After stirring for 2 hours at room temperature, a $^1H$ NMR spectrum of the reaction mixture is run. The disappearance of the doublets characteristic of the $CH_3$ groups β to the carbonyls shows that all of the starting material B' has been consumed.

80% of the solvent is then evaporated off under reduced pressure, and the solution obtained is then mixed with ether and filtered through a sinter funnel. The solvent is then evaporated off to give 11.8 g of precursor B".

30% of free OHs are still present according to the $^1H$ NMR spectrum.

Example 3
Preparation of a Polyethyl Acrylate-b-polydimethylsiloxane-b-polyethyl Acrylate Triblock Copolymer 0.1 g of precursor A" from Example 1, 1.39 g of ethyl acrylate, 2 g of toluene and 2.28 mg of AIBN are placed in a Carius tube. Three cycles of "freezing-vacuum-return to room temperature" are performed on the contents of the tube. The tube is then sealed under vacuum by flame, and is then placed in a bath thermostatically maintained at 80° C., for 8 hours. The tube is subsequently cooled and then opened.

The contents of the tube are analyzed by gas chromatography GC (THF):

number-average molar mass ($M_n$)=15 800 g/mol polydispersity index ($I_p=M_w/M_n$)=1.42 degree of conversion=89% (GC).

Example 4
Preparation of a Polyvinyl Acetate-b-polydimethylsiloxane-b-polyvinyl Acetate Triblock Copolymer.

0.1 g of precursor A" from Example 1, 0.59 g of vinyl acetate, 1.05 g of cyclohexane and 2.28 mg of AIBN are placed in a Carius tube. Three cycles of "freezing-vacuum-return to room temperature" are performed on the contents of the tube. The tube is then sealed under vacuum by flame, and is then placed in a bath thermostatically maintained at 80° C., for 4 hours. The tube is subsequently cooled, and then opened.

The contents of the tube are analyzed by gas chromatography GC (THF):

$M_n$=4 200 g/mol $I_p$=1.35 degree of conversion=62% (GC).

What is claimed is:

1. A process for the preparation, by thermal activation, of silicone and organic hybrid copolymers comprising units of formula (I):

$$R_xU_ySiO_{[4-(x+y)]/2}$$

wherein x is equal to 0, 1, 2 or 3, y is equal to 0, 1, 2 or 3 with $2 \leq (x+y) \leq 3$ and y is other than 0 for at least one of the units of the hybrid copolymer, the symbols R, which are identical or different, represent:

a linear or branched alkyl radical containing 1 to 8 carbon atoms, optionally substituted with at least one halogen, a cycloalkyl radical containing between 5 and 8 ring carbon atoms, which is optionally substituted, an aryl radical containing between 6 and 12 carbon atoms, which are substituted, an aralkyl radical having an alkyl group containing between 5 and 14 carbon atoms and an aryl group containing between 6 and 12 carbon atoms, optionally substituted on the aryl group with halogens, alkyls or alkoxyls containing 1 to 3 carbon atoms, the symbols U, which are identical or different, represent (II):

$$\left[(R^1)_{x'}-Z\underset{}{\overset{S}{\underset{}{\overset{\|}{C}}}}-S-\left[\underset{X'}{\overset{X}{\underset{|}{\overset{|}{C}}}}-(CV=CV')_a-CH_2\right]_m\right.$$

$$\left.-C(R^2R^3)-(C=O)-W-S_p-\right]$$
(II)

wherein:

x'=1, 2, 3 or 4 depending on the valency of Z,

Z, which are identical or different, represent a carbon, sulfur, oxygen, phosphorus, nitrogen atom or a free valency, $R^1$, which radicals are identical or different, represent:

an optionally substituted alkyl, acyl, aryl, alkene or alkyne group (i), a saturated or unsaturated, optionally substituted or aromatic carbon-based ring (ii), or a saturated or unsaturated, optionally substituted heterocycle (iii), these radicals (i), (ii) and (iii) optionally being substituted with:

substituted phenyl groups, substituted aromatic groups, alkoxycarbonyl, aryloxycarbonyl (—COOR$^5$), carboxyl (—COOH), acyloxy (—O$_2$CR$^5$), carbamoyl (—CONR$^5_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$^5_2$), halogen, allyl, epoxy, alkoxy (—OR$^5$), S-alkyl, S-aryl, alkaline salts of carboxylic acids, alkaline salts of sulfonic acid, polyalkylene oxide (PEO, PPO) chains, cationic substituents, quaternary ammonium salts, wherein R$^5$, which are identical or different, representing an alkyl group, aryl group, or a polymer chain, a group (iv) of formula —$C_nF_{(2n+1)}$ with n being between 1 and 20,
a group (v) of the following formula:

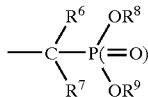

wherein:
$R^6$, $R^7$, which are identical or different, are halogen atoms, —$NO_2$, —$SO_3R^{10}$, —NCO, —CN, —$OR^{10}$, —$SR^{10}$, —$N(R^{10})_2$, —$COOR^{10}$, —$O_2CR^{10}$, —$CON(R^{10})_2$, —$NCO(R^{10})_2$ or —$C_nF_{(2n+1)}$ with n being between 1 and 20;
wherein $R^{10}$ representing:
a hydrogen atom, or
an alkyl, alkenyl, alkynyl, cycloalkenyl, cycloalkynyl, alkaryl, aralkyl, heteroaryl or aryl radical optionally linked to an aromatic or non-aromatic heterocycle; these radicals optionally being substituted with:
one or more groups, which are identical or different, which are halogen atoms, =O, =S, —OH, alkoxy, SH, thioalkoxy, $NH_2$, monoalkylamino, dialkylamino, CN, COOH, ester, amnide or $C_nF_{(2n+1)}$ optionally interrupted with one or more atoms selected from the group consisting of O, S, N and P;
or a heterocyclic group optionally substituted with one or more groups as defined above;
or $R^6$ and $R^7$ together form, with the carbon atom to which they are linked, a group =O, =S, a hydrocarbon-based ring or a heterocycle; and
$R^8$ and $R^9$, which are identical or different, represent a group as defined above for $R^{10}$; or together form a $C_2$-$C_4$ hydrocarbon chain optionally interrupted with a hetero atom which is O, S or N;
V and V', which are identical or different, represent: H, an alkyl group or a halogen,
X and X', which are identical or different, represent H, a halogen, a group $R^4$, $OR^4$, $O_2COR^4$, NHCOH, OH, $NH^2$, $NHR^4$, $N(R^4)^2$, $(R^4)^2N^+O^-$, $NHCOR^4$, $CO_2H$, $CO_2R^4$, CN, $CONH_2$, $CONHR^4$ or $CONR^4_2$, wherein $R^4$ is alkyl, aryl, aralkyl, alkaryl, alkene or organosilyl groups, optionally perfluorinated and optionally substituted with one or more carboxyl, epoxy, hydroxyl, alkoxy, amino, halogen or sulfonic groups,
$R^2$ and $R^3$, which are identical or different, represent:
an optionally substituted alkyl, acyl, aryl, alkene or alkyne group (i), a saturated or unsaturated, optionally substituted or aromatic carbon-based ring (ii), a saturated or unsaturated, optionally substituted heterocycle (iii), a hydrogen atom or groups: alkoxycarbonyl, aryloxycarbonyl (—$COOR^5$), carboxyl (—COOH), acyloxy (—$O_2CR^5$), carbamoyl (—$CONR^5_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—$NR^5_2$), halogen, allyl, epoxy, alkoxy (—$OR^5$), S-alkyl, S-aryl, groups of hydrophilic or ionic nature such as alkaline salts of carboxylic acids, alkaline salts of sulfonic acid, polyalkylene oxide (PEO, PPO) chains, cationic substituents (quaternary ammonium salts), $R^5$, which are identical or different, representing an alkyl or aryl group, or a polymer chain, the radicals (i), (ii) and (iii) optionally being substituted with:

substituted phenyl groups, substituted aromatic groups, alkoxycarbonyl, aryloxycarbonyl (—$COOR^5$), carboxyl (—COOH), acyloxy (—$O_2CR^5$), carbamoyl (—$CONR^5_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—$NR^5_2$), halogen, allyl, epoxy, alkoxy (—$OR^5$), S-allyl, S-aryl, alkaline salts of carboxylic acids, alkaline salts of sulfonic acid, polyalkylene oxide (PEO, PPO) chains, cationic substituents (quaternary ammonium salts), wherein $R^5$, which are identical or different, representing an alkyl, aryl group, or a polymer chain,
W, which are identical or different, is equal to a divalent radical selected from the group consisting of —O—, —$NR^4$—, —NH— and —S—,
Sp, which are identical or different, is a coupling unit consisting of a divalent organic radical of formula —$(CH_2)_{x''}$—, wherein x'' is between 1 and 20, this radical optionally being substituted with or containing at least one hetero atom,
a=0 or 1,
m≧1, and, when m>1, the repeating unit moieties of index m are identical or different,
said process comprising the steps of contacting:
at least one ethylenically unsaturated monomer of formula (III):

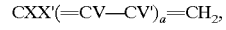

a precursor silicone compound comprising units, which are identical or different, of formula (IV):

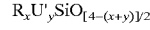

wherein:
R, x and y correspond to the values given above,
and the monovalent radical U' is of formula (V) below:

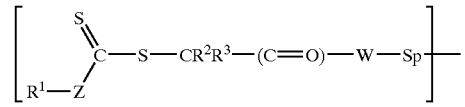

and a free-radical polymerization initiator.

2. The process as claimed in claim 1, wherein the silicone and organic hybrid copolymer consists of a linear silicone skeleton comprising from 1 to 300 units of formula (I), bearing from 1 to 50 radicals U.

3. The process as claimed in claim 1, wherein at least one of the symbols U' has the formula (VI) below:

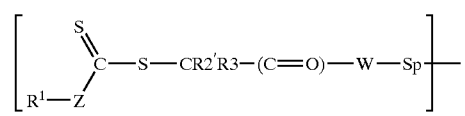

wherein:
$R^2$ and $R^3$, which are identical or different, represent a hydrogen atom, a cyano, alkoxycarbonyl, alkyl, acyl, aryl, alkene or alkyne group, which is optionally substituted; and
W has the definition given in claim 1.

4. The process as claimed in claim 3, wherein W is equal to an oxygen atom.

5. The process as claimed in claim 1, wherein Z is an oxygen atom or a sulfur atom.

6. The process as claimed in claim 1, wherein at least one monovalent radical U' is one of the following units:

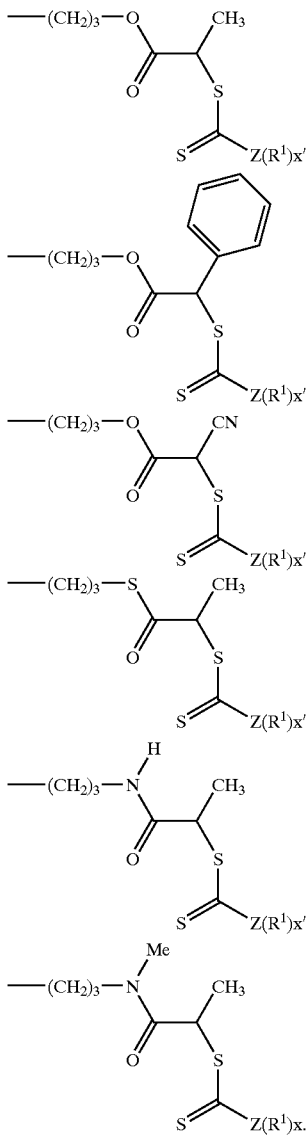

7. The process as claimed in claim 1, wherein the ethylenically unsaturated monomer is styrene, styrene derivatives, butadiene, chloroprene, (meth)acrylic esters, vinyl nitriles, vinyl esters or unsaturated carboxylic acid amides.

8. The process as claimed in claim 7, wherein the ethylenically unsaturated monomer is vinyl acetate, vinyl versatate or vinyl propionate.

9. A process for preparing silicone and organic hybrid copolymers, wherein the implementation of the process as claimed in claim 1 is repeated at least once, using:
different monomers than in the preceding implementation, and
in place of the precursor silicone compound of formula (II), the hybrid copolymer comprising the units (I) derived from the preceding implementation.

10. The process as claimed in claim 1, wherein the precursor silicone compound of general formula (IV) is a polymer derived from the reaction:
(i) of a silicone comprising units of formula (VII):

wherein the monovalent radical U" is of formula (VIII) below:

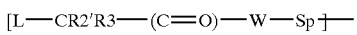

wherein:
W and Sp are as above defined in claim 1,
L is a nucleophilic group,
(ii) with a compound of general formula (IX), (X) or (XI) below:

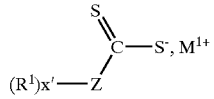   (IX)

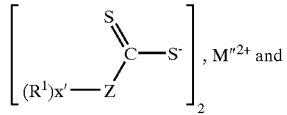   (X)

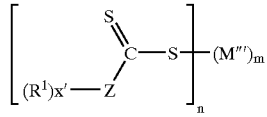   (XI)

wherein:
$R^1$, Z and x' have the definitions given above,
$M^{1+}$ represents $K^+$, $Na^+$, $NR_4^+$ or $PR_4^+$, R having the definition given for R in formula (I),
$M''^{2+}$ represents an alkaline-earth metal,
M''' represents Zn, Cd, m is equal to 1 or 2, n is equal to 1, 2, 3 or 4 and optionally m is equal to 1 and n is equal to 2.

11. The process for preparing the silicone of formula (VII) as claimed in claim 10, comprising the steps of contacting:
(i) a silicone comprising units of formula (XII):

wherein the monovalent radical U''' is according to formula XIII: —Sp—WH
(ii) and a compound of formula

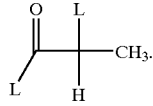

12. the process according to claim 10, wherein L is $Br^-$; $Cl^-$, $I^-$, $OTs^-$, $OMs^-$, $(C^6H^6)$—$(C=O)$—$O^-$, $(CH_3)$—$(C=O)$—$O^-$, or $(CF_3)$—$(C=O)$—$O^-$.

13. The process as claimed in claim 1, wherein the silicone and organic copolymer further comprises units of formula (XIV):

wherein:

x is equal to 0, 1, 2 or 3, y is equal to 0, 1, 2 or 3 and z is equal to 1, 2 or 3 with $2 \leqq (x+y+z) \leqq 3$, and F is a group bearing at least one function as hydroxyl, alkoxy, thiol, amine, epoxy or polyether.

14. The process as claimed in claim 1, wherein the polymer obtained has a silicone skeleton containing at least one block selected from the group consisting of polystyrene, polymethyl acrylate, polyethyl acrylate, poly(ter-butyl acrylate), polyvinyl acetate, polybutyl acrylate, polyacrylamide, poly(2-dimethylaminoethyl acrylate) and poly(2-hydroxyethyl acrylate).

15. The process as claimed in claim 14, wherein the polymer obtained has a polydispersity index of not more than 2.

16. The The process as claimed in claim 15, wherein the polydispersity index has a polydispersity index of not more than 1.5.

* * * * *